J. N. CLARK.
Dental-Plate.
No. 160,573.  Patented March 9, 1875.
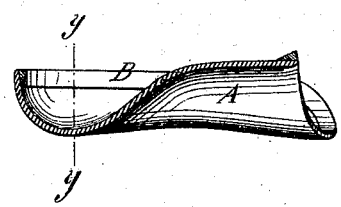
Fig. 1
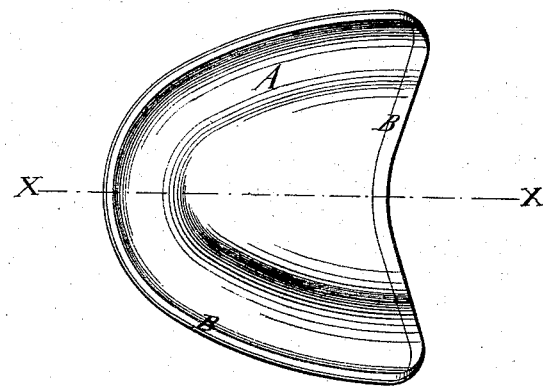
Fig. 2
Fig. 3
WITNESSES:
INVENTOR:
J. N. Clark
BY
ATTORNEYS.

UNITED STATES PATENT OFFICE.

JONATHAN N. CLARK, OF BRADFORD, VERMONT.

IMPROVEMENT IN DENTAL PLATES.

Specification forming part of Letters Patent No. 160,573, dated March 9, 1875; application filed June 1, 1874.

CASE B.

*To all whom it may concern:*

Be it known that I, JONATHAN N. CLARK, of Bradford, in the county of Orange and State of Vermont, have invented a new and useful Improvement in Dental Plates, of which the following is a specification:

This invention relates to a new and useful improvement in dental plates, whereby such plates are made easier to the gums than plates of ordinary construction; and it consists of a wedge-shaped rim of soft rubber on the inner edge of the plate, forming a cushion against the gum while preserving a perfect vacuum.

In the accompanying drawing, Figure 1 is a section of Fig. 2 taken on the line $x$ $x$. Fig. 2 is a top or inside view of the plate, showing the cushion-rim. Fig. 3 is a section of the cushion on the line $y$ $y$ of Fig. 1.

Similar letters of reference indicate corresponding parts.

A represents the plate, which is made of vulcanized rubber in the ordinary manner. B is the cushion. This cushion consists of a narrow strip of soft india-rubber, triangular or wedge-shaped in cross-section. The thick edge of this cushion is even with the edge of the plate A, while the thin edge or acute angle of the wedge adheres tightly to the inside of the plate. In ordinary plates the cushion would not, in width, exceed one-eighth of an inch, having one of its sides tightly attached to the plate A, as shown in the drawing.

I am aware that attempts have heretofore been made to cushion the plate to the gum, and that the entire inner surface of the plate has been covered with soft rubber for that purpose, but this interferes with the vacuum which it is necessary to maintain, and defeats the main object the dentist has in view. By means of the narrow wedge-shaped cushion all objections of this nature are obviated, the plate sets easily in the mouth, producing no irritation, and excluding air as well as particles of food from the upper side of the plate.

I am aware that a soft rubber rim has been joined to the edge of the plate as a continuation, and this I do not claim; but What I do claim is—

A packing-ridge of soft rubber located directly upon the inner edge of the plate, when said ridge is of wedge shape, as and for the purpose specified.

JONATHAN N. CLARK.

Witnesses:
JESSE A. WARREN,
FRANK H. EVERETT.